March 25, 1952 W. P. MOLAND ET AL 2,590,116
VACUUM TUBE COMPARATOR
Filed April 10, 1951 3 Sheets-Sheet 1

INVENTORS.
HOWARD H. FERRIS
WARREN P. MOLAND
BY Wade Koontz
Orlando L. McKeon
ATTORNEYS March 25, 1952  W. P. MOLAND ET AL  2,590,116
VACUUM TUBE COMPARATOR
Filed April 10, 1951  3 Sheets-Sheet 3
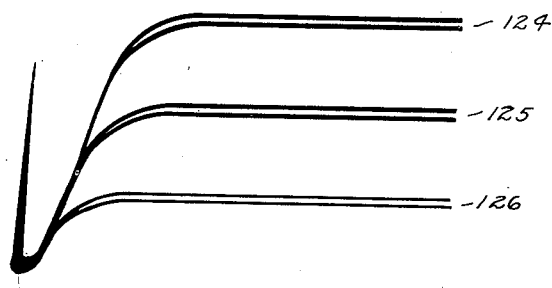
_Fig.3_
_Fig.4_
INVENTORS.
HOWARD H. FERRIS
WARREN P. MOLAND
BY
ATTORNEYS Patented Mar. 25, 1952

2,590,116

UNITED STATES PATENT OFFICE 2,590,116

VACUUM TUBE COMPARATOR

Warren P. Moland, Dorchester, and Howard H. Ferris, Milton, Mass.

Application April 10, 1951, Serial No. 220,324

5 Claims. (Cl. 315—370)

(Granted under the act of March 3, 1883, as amended April 30, 1928; 370 O. G. 757)

The invention described herein may be manufactured and used by or for the Government for governmental purposes without payment to us of any royalty thereon.

This invention concerns the testing of vacuum tubes and more specifically to a tube voltage and current comparator.

In the past, balancing variable resistor circuits have been used in determining the performance of vacuum tubes in terms of the transconductance between pairs of elements therein.

The present invention comprises a saw tooth voltage generator supplying a succession of plate potentials as a saw tooth voltage or wave to a reference tube and to a tube under test, to the control grids of which the outputs from three thyratrons that fire in succession during each saw tooth wave are applied and means for causing the tube outputs to appear simultaneously on the screen of a cathode ray tube.

The objects of the present invention comprise the provision of a new and improved comparator for displaying the characteristics of a pair of vacuum tubes to the electrodes of which desired potentials are applied; to a comparator making its presentation within the heating time of the tubes in its circuits; and to an improved comparator to be used in tube design and test.

An embodiment of the present invention is shown in the accompanying drawings wherein:

Figs. 3 and 4 are graphs of illustrative tube performance using the circuit shown in Fig. 2.

Figure 1:
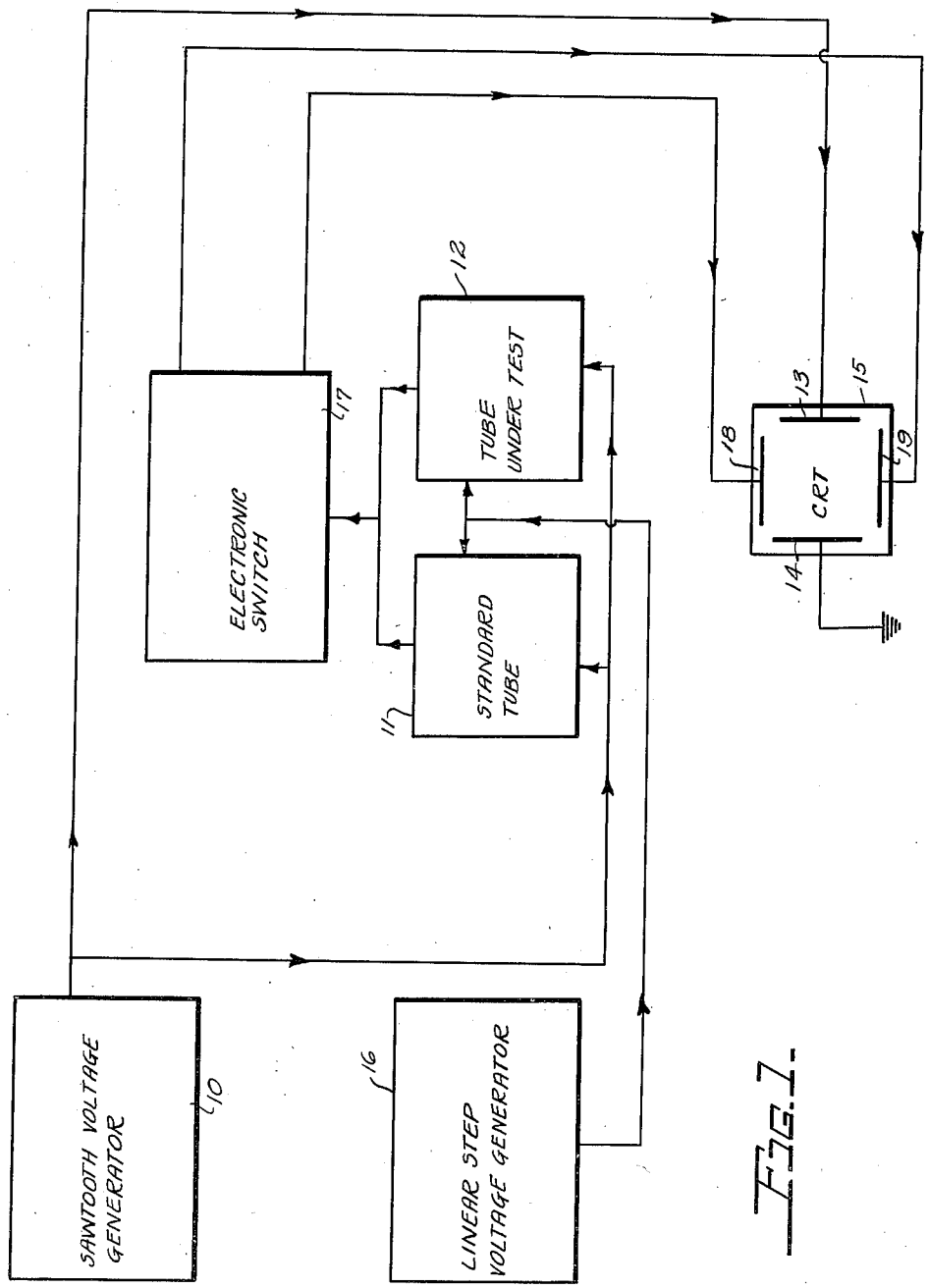
Fig. 1 is a block circuit diagram of a vacuum tube comparator that embodies the present invention.

In the circuit shown in Fig. 1 a saw tooth voltage generator 10 supplies a saw tooth voltage to the plates of both a standard tube 11 and a tube under test 12 and across the horizontal deflection plates 13 and 14 of a cathode ray tube 15. A linear step voltage generator 16 passes its output to the control grids of both vacuum tubes 11 and 12. Output from the tubes 11 and 12 is applied through an electronic switch 17 to across the vertical deflection plates 18 and 19 of the cathode ray tube 15.

Operatively the generator 10 supplies voltage to the plates of the vacuum tubes 11 and 12 and actuates the horizontal sweep of the cathode ray tube 15. The vacuum tubes 11 and 12 receive upon their control grids the output from the linear step voltage generator 16. The tubes 11 and 12 periodically conduct under the influence of the output from the generator 16. The outputs from the tubes 11 and 12 are applied across the vertical deflection plates of the cathode ray tube 15. Comparable conduction patterns for the standard tube 11 and for the tube 12 under test then appear for comparison beside each other on the screen of the cathode ray tube 15, as represented in Figs. 5 and 6 of the drawings.

Figure 2:
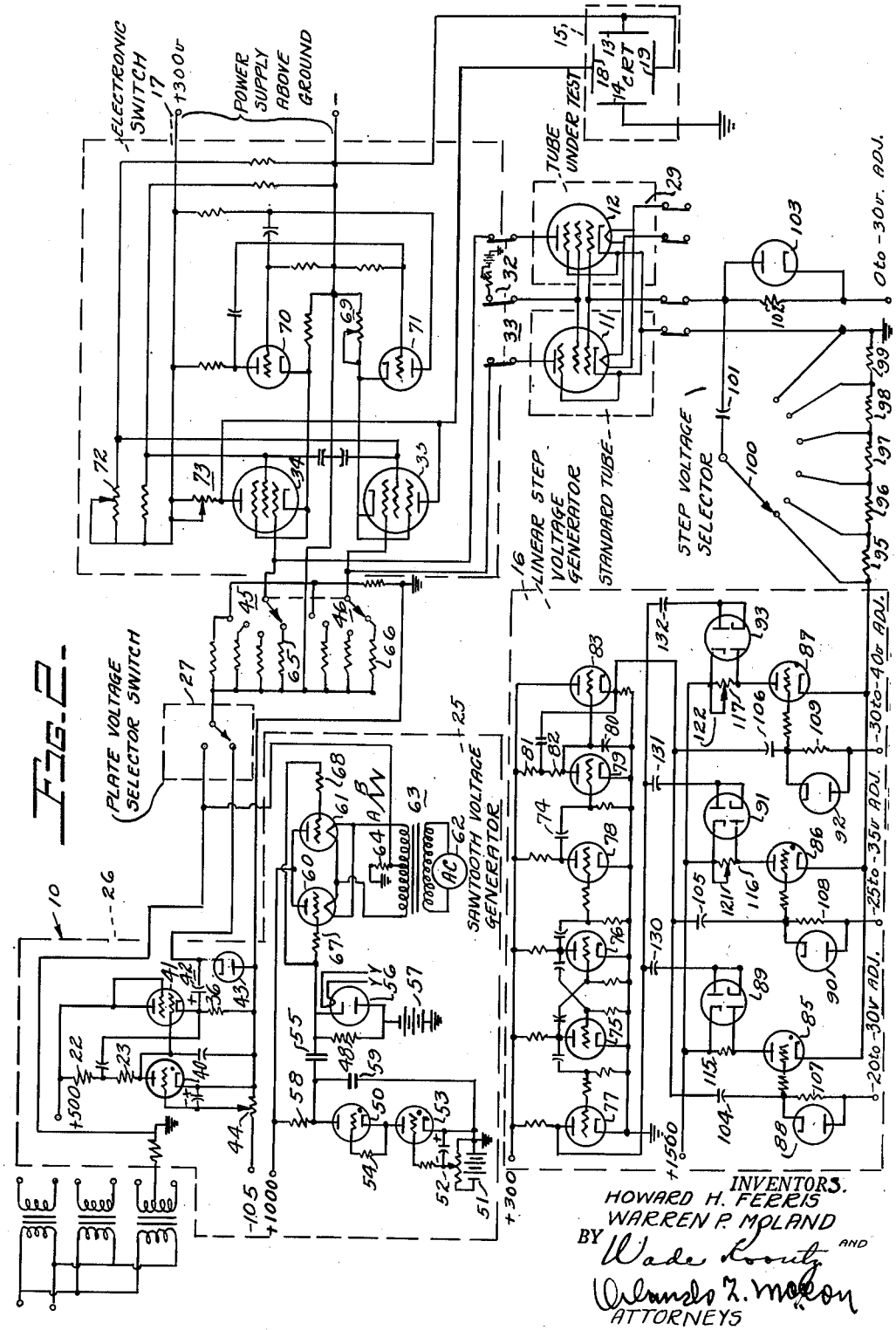
Fig. 2 is a schematic circuit diagram of the comparator shown in Fig. 1.

A schematic circuit diagram of a vacuum tube comparator that embodies the present invention is shown in Fig. 2 of the drawings. In the schematic circuit a saw tooth of high voltage is generated in a high voltage saw tooth voltage generator 25 and a saw tooth of low voltage is generated in a low voltage saw tooth voltage generator 26. One of these voltages at a time is applied by a plate voltage selector switch 27 through a suitable resistor in an amplifier selector 28 to an amplifier 30 in an electronic switch 17 that also contains a multivibrator 20 of the flip-flop or Eccles-Jordan type. An above ground power supply 24 supplies +300 volts to the movable taps of the amplifier gain balance variable resistors 72 and 73 in the electronic switch 17.

Output from the linear step voltage generator 16 is passed through a step voltage selector 31 to the control grids of the tubes 11 and 12 in a tube adapter 29. The tubes 11 and 12 have an adjustable screen voltage applied by switch 32 to their screen grids. The screen voltage switch is closed on the closing of the tube switches 33 with which it is ganged. Upon the closing of the pair of switches 33, the compared tube outputs are passed to the control grids of amplifier tubes 34 and 35 in the amplifier 30 of the electronic switch 17.

One of the saw tooth voltage generators 26 illustratively may be designed to generate a maximum voltage of 300 volts across a load drawing a peak current of 60 milliamperes. The other saw tooth voltage generator 25 illustratively may be designed to generate a maximum of 700 volts across a load drawing 500 milliamperes peak current and hence produces a higher output voltage than the generator 26. The lower voltage generator 26 is supplied with +500 volts potential and the higher voltage generator 25 is supplied with +1000 volts potential.

The low voltage saw tooth generator 26 comprises a relaxation oscillator 21 containing the tubes 40, 41 and 43. The positive potential supply of +500 volts is applied to the plate of thyratron tube 40 through series connected resistors 22 and 23 and directly to the plate of the vacuum tube 41. A negative potential of −105 volts is supplied to the grid of the thyratron 40 through the adjustable plate voltage control potentiometer 44 and through the resistor of the potentiometer 44 to the cathode of the thyratron 40 and to the plate of the diode 43. The cathode of the vacuum tube 41 is connected through a resistor 36 with the cathode of the tube 40 and with the plate of the diode 43. The output from the cathode follower tube 41 is coupled with the amplifier input selector 28 through the capacitor 42 and is held at fixed potential by the action of the diode tube 43. The amplitude of the saw tooth wave output of the low saw tooth generator 26 is controlled by the bias level of the grid of the tube 40 established by the adjustment of the movable tap on the adjustable potentiometer 44 in the grid-cathode circuit of the thyratron 40. The output from the low voltage generator 26 is supplied to the selector 28 and more particularly to one terminal of the plate voltage selector switch 27 therein.

The high voltage saw tooth generator 25 comprises an oscillator 49 and a constant voltage cathode follower device of very low impedance comprising the tubes 60 and 61 and the transformer 63. The oscillator 49 comprises a pair of series connected thyratrons 50 and 53 connected in parallel with a capacitor 59 to ground. A +1,000 voltage potential is applied in the oscillator 49 through a resistor 58 to the plate of one thyratron tube 50 to connected plates of capacitors 55 and 59 and to the cathode of the diode 56. The +1,000 volt potential also is applied directly and in parallel to the plates of the vacuum tubes 60 and 61 in the constant voltage device. A direct current potential from a battery 51 of illustratively 67½ voltage is applied across the resistor of a variable potentiometer 52 having a variable tap from which all or part of this voltage is applied as grid bias to the grid of a second thyratron tube 53. When the lower tube 53 is caused to be fired from the charge on the capacitor 59 and the setting of the tap on the potentiometer 52, the potential of the grid of the upper tube 50 tends to stay fixed applying a positive voltage on the grid of the upper tube which triggers it. The plate of the tube 53 is connected to the grid of the thyratron tube 50 through a resistor 54 and is connected directly to the cathode of the tube 50. The plate of the thyratron tube 52 is coupled by capacitor 55 with the cathode of the diode tube 56. The diode tube 56 has potential from a voltage source 57 supplied to its plate and is shunted by a resistor 48 to provide a clamping circuit that maintains the voltage supplied by the oscillator 49 above the base line. A charge impressed upon the capacitor 59 in the plate circuit of the thyratron 50 causes both of the series connected thyratrons 50 and 53 to conduct. The potentiometer 52 provides a control for the oscillator 49. The battery 57 illustratively also may be 67½ volts. The cathode of the tube 56 is coupled in parallel through resistors 67 and 68 with the grids of the tubes 60 and 61.

In the constant voltage device in the voltage generator 25, an alternating current source 62 is applied through the transformer 63 to the cathodes of the tubes 60 and 61. A center tap on the secondary winding of the transformer 63 is applied to ground through a resistor 64. Output from the high saw tooth voltage generator 25 is supplied from the center tap on the secondary winding of the transformer 63 that is connected to one terminal of the plate voltage selector switch 27 in the amplifier selector 28.

Within the amplifier input selector 28 the switch arm of the plate voltage selector switch 27 is resistively connected with a desired plurality of resistors of preferred magnitudes arranged in parallel in groups to be swept by the ganged switch arms of the switches 45 and 46. The switch arms of the switches 45 and 46 are connected directly and respectively to the control grids of amplifier tubes 34 and 35 in the amplifier 30 in the electronic switch 17.

The output from either the high or the low saw tooth voltage generator 25 or 26 may be selected by the plate voltage selector switch 27 in the amplifier input selector 28. The saw tooth voltage so selected is applied as a sweep voltage directly and in parallel to the ungrounded horizontal deflection plate 13 and to one vertical deflection plate 19 of the cathode ray tube 15. The saw tooth voltage so selected also is applied through a pair of selected resistors, such as the resistors 65 and 66 as examples, in the ganged switches 45 and 46 and through the ganged tube switches 33 in the tube adaptor 29, together with the outputs from the plates of the vacuum tubes 12 and 11 that are being compared, to the control grids of the amplifier tubes 34 and 35 in the amplifier 30 of the electronic switch 17, respectively, throughout. The voltages developed across the resistors 65 and 66 are proportional to the plate currents of the tubes 12 and 11, respectively, being compared.

In the multivibrator 20 of the electronic switch 17 multivibrator tubes 70 and 71 are connected in push-pull with resistors in series between their cathodes. The tubes 70 and 71 function as a multivibrator in that they alternately cut off the amplifier tubes 34 and 35 in the amplifier 30. A variable resistor 69 between the cathodes of the tubes 70 and 71 serves to adjust the cathode bias on the tube 71 and thereby assists in balancing the multivibrator 20. The plates of the electronic switch amplifier tubes 34 and 35 receive a potential of +300 volts through adjustable amplifier gain balancing potentiometer 73 from the power supply 24. The plates of the tubes 34 and 35 are connected in parallel directly with and alternately pass their outputs to the upper vertical deflection plate 18 of the cathode ray tube 15.

The cathode ray tube plates 13 and 19, in addition to being connected directly to the sweep arm of the switch 27, are connected in parallel with the negative terminal of the power supply 24 and, through amplifier gain balancing resistors 72 and 73, to the plates of the amplifier tubes 34 and 35.

The plate current variation applied to the vertical deflection plates 18 and 19 of the cathode ray tube 15 is that of first one tube and then the other of the tubes 11 and 12. As a consequence it is possible to compare simultaneously the merits and the characteristics of the two vacuum tubes from the presentation on the screen of the cathode ray tube 15.

To compare the characteristics of the two tubes 11 and 12 with various levels of grid voltage, plotted as indicated against time in Fig. 3 of the drawings, a linear step voltage is generated and is applied to the control grids of the tubes 11 and 12. In the linear step voltage generator 16 a +300 voltage plate potential is supplied to a multivibrator 75', to a pair of limiters 77' and 78', to a gate circuit 79' and to a cathode follower 83'. Output from the multivibrator 75', that may be a common form of free running multivibrator comprising the tubes 75 and 76, is coupled to the two limiter tubes 77 and 78 that minimizes variations in the amplitude of the output from the multivibrator 75' to the gate 79' and to a duo-diode 93. The output from the limiter tube 78 is passed through a capacitor 74 to the grid of the gating tube 79 in the gating circuit 79'. The gating tube 79 conducts each time its bias is overcome by the charge on the capacitor 80 from the +300 voltage passing through the series connected plate resistors 81 and 82. Each time the capacitor 80 discharges a saw tooth voltage is generated. The saw tooth voltage output from the gating tube 79 is passed to the grid of the cathode follower tube 83.

A cathode follower tube 83 is connected in parallel through capacitors 104, 105 and 106 in series with resistors 107, 108 and 109 separately shunted by diodes 88, 90 and 92, respectively throughout, with a desired plurality of adjustable negative voltages applied as grid biases to the grids of a corresponding plurality of thyratrons 85, 86 and 87. A plate voltage of +1500 volts is applied in parallel through resistors 115, 116 and 117 to the plates of the thyratrons 85, 86 and 87. The resistors 115, 116 and 117 are shunted respectively with one-half wave rectifier twin diode tubes 89, 91 and 93 capacitively coupled respectively by capacitors 130, 131 and 132 with the voltage input into the plate of the limiter tube 77. The resistors 116 and 117 preferably are variable resistors, as shown. The number of thyratrons 85, 86 and 87 with their associated circuits that are used depends on the number of grid voltage steps desired to be applied to the control grids of the tubes 11 and 12 during the application of each saw tooth to the plates thereof.

The bias levels of the thyratron tubes 85, 86 and 87 are so established that these tubes are nonconducting in the absence of the saw tooth voltage output from the cathode of the tube 83. With the thyratron tubes 85, 86 and 87 nonconducting the voltage drop in the step voltage selector 31 across the series resistors 95 through 99, inclusive, is zero. With the thyratron tubes 85, 86 and 87 conducting, as the positive going saw-tooth voltage rises in its application to the grids of the thyratron tubes 85, 86 and 87, the firing potential of the tube 85 will be reached first. The firing of the thyratron 85 causes it to conduct through a selected part or all of the series connected common cathode resistors 95 to 99, inclusive, and causing the conducted potential to be applied through the switch arm 100 and the capacitor 101 in parallel to the control grids of both of the tubes 11 and 12. This develops the first step voltages 110 and 110′ in Fig. 3 of the tubes 11 and 12, respectively, as static characteristic curves of the tubes, with grid voltages plotted along the ordinate and time plotted along the abscissa. The control grids of the tubes 11 and 12 have an adjustable bias of from zero to —30 volts applied thereto through a resistor 102 shunted by a diode tube 103.

As the saw-tooth voltage continues to rise, the firing potential of the tube 86 will be reached and as its plate current flows through part or all of the common cathode resistors 95 to 99 inclusive, the second step voltage 111 and 111′ in Fig. 3 of the tubes 11 and 12 respectively, is developed. In a similar manner, as the saw tooth voltage continues to rise, the firing potential of tube 87 will be reached and the third step voltage 112 and 112′ of Fig. 5 of the tubes 11 and 12 respectively, is developed. Fig. 3 represents the graphical presentation of a family of static characteristic curves for each of the tubes 11 and 12. As previously stated, the number of steps may be changed by changes in the number of thyratrons 85, 86 and 87 in the linear step voltage generator 16, as preferred.

In Fig. 4 the pair of curves 124 illustratively are at zero volts bias step; the pair of curves 125 are at —3 volts bias step; and the pair of curves 126 are at —6 volts bias step.

In order to de-ionize the thyratrone tubes 85, 86 and 87, the output from the plate of the limiter tube 77 is applied in parallel through the capacitors 120, 121 and 122 to one side of the duo diodes 89, 91 and 93. A +1500 volts potential is applied as plate potential through resistors 115, 116 and 117, respectively, in parallel to the plates of the thyratrons 85, 86 and 87. Variable adjustable potentiometer taps 121 and 122 introduce adjustable resistances to the plates of the duo diodes 91 and 93 on the tube side to which the +1500 volts is applied. Step voltage increments, such as those shown in Fig. 3, are controlled by the position on its contacts of the step voltage selector switch arm 100. This application of the step voltage increments to the control grids of the tubes 11 and 12 allows an apparently simultaneous presentation on the screen of the cathode ray tube 15 of two families of static curves that are separately characteristic of and that permit the comparison of the vacuum tubes 11 and 12. The described equipment provides control over the magnitudes of both grid and plate potentials to be applied to the tubes 11 and 12 to be compared.

In many instances it is desirable to be able to identify and to use vacuum tubes of like characteristics. Past methods used to identify balanced tubes with certainty often consumed long periods of time. With the comparator described herein, vacuum tubes may be compared and tested rapidly. The described comparator also may be used to provide a quick check on design calculations and to permit the collection of test data which may be used to improve designs in tubes and to simplify calculations.

The characteristics of vacuum tubes with plate, grid and cathode electrodes, commonly involve the relationships between grid voltage, plate current anad plate voltage. The measure of the amplification provided by a tube is the ratio of the plate voltage change required for a given change in plate current to the grid voltage change necessary to produce the same change in plate current. The measure of the variational or alternating current plate resistance is the ratio, for a constant grid voltage, of a small plate voltage change to a small plate current change it effects. The measure of grid-plate transconductance is the ratio, with a constant plate voltage, of a small change in plate current to a small change in grid voltage causing the change in plate current.

Important characteristics of vacuum tubes having grid, plate and cathode electrodes are the relationships between plate current anad plate voltage with constant grid voltage; and plate current and grid voltage with constant plate voltage. Curves showing plate current as a function of grid voltage have shapes very similar to those showing plate current with varying plate voltage, the difference being in the scales involved and in the location of the curves with reference to the axes. Characteristic curves are commonly expressed as a relationship between plate current and plate voltage, with the grid voltage remaining constant. The device described herein provides visual presentations of these relationships.

In balanced detectors, balanced modulators, direct current amplifiers and the like, it is desirable to use vacuum tubes having like characteristics. The present invention serves to minimize the time required to identify vacuum tubes having like characteristics. The present device makes the application of desired voltages on the tube electrodes optional with a minimum time factor of that necessary to bring the tube up to its operating temperature. The device described herein is adapted for use with all receiver type vacuum tubes, including power types. The present comparator graphically displays one or two families of static characteristic curves simultaneously on the screen of a cathode ray tube. With two vacuum tubes of like characteristics the curves coincide.

In operating the equipment, it is first brought up to its proper operating temperature, the amplifier tubes 34 and 35 are balanced by the variable resistors 72 and 73, the electronic switch multivibrator 20 is balanced by the variable resistor 69, aand the tubes 11 and 12 to be compared are placed in their adapter sockets in the tube adapter 29. The plate voltage selector switch 27 in the amplifier input selector 28 is caused to engage a contact connected with either the high or the low voltage generator 25 or 26 and the plate voltage control in selector 28 is adjusted to provide the required amplitude. The amplifier gain variable resistors 72 and 73 are adjusted for a proper amplifier gain control to give the required deflection. The step voltage selector switch arm 100 is then adjusted to the desired value of grid voltage increments for application to the control grids of the tubes 11 and 12 under test.

In making an amplifier balance adjustment, the tubes 11 and 12 are removed from their adapter sockets and the amplifier input selector switch 27 is placed in its balance position. The electronic switch balance control is then adjusted until both amplifier outputs from the tubes 34 and 35 start at the same level. The amplifier gain balance control is then adjusted until the two amplifier outputs coincide. In the event an amplifier unbalance exists the two tube amplifiers are caused to diverge from a common start.

It is to be understood that the circuitry and the associations shown and described herein have been submitted for the purpose of presenting an operable embodiment of the present invention and that similarly functioning modifications may be made therein without departing from the scope of the present invention.

What we claim is:

1. A device for visually indicating for comparison the static characteristic curves of plate voltage versus current, of a pair of vacuum tubes comprising a cathode ray tube having a fluorescent viewing screen and two sets of beam deflecting means operative to deflect the beam simultaneously in planes parallel to mutually perpendicular coordinate axes respectively, a pair of plate circuits each having an identical load resistance therein each circuit being operatively associated with one of said pair of vacuum tubes, a saw-tooth voltage wave generator connected in parallel with said plate circuits and one of the sets of cathode ray beam deflecting means, means for selectively varying the peak voltage of the saw-tooth output of said generator, a pair of amplifiers each operatively connected across the load resistance of one of said plate circuits such that the amplifier output voltage is a measure of the current flow in the associated plate circuit, an electronic switching means connected to said amplifiers and operative to alternately connect the amplifier outputs to the other set of cathode ray beam deflecting means and means for supplying a selected grid voltage to the grids of the vacuum tubes to be compared.

2. A device for visually indicating for comparison the static characteristic curves of plate voltage versus current, of a pair of vacuum tubes comprising a cathode ray tube having a fluorescent viewing screen and two sets of beam deflecting means operative to deflect the beam simultaneously in planes parallel to mutually perpendicular coordinate axes respectively, a pair of plate circuits each having an identical load resistance therein each circuit being operatively associated with one of said pair of vacuum tubes, a saw-tooth voltage wave generator connected in parallel with said plate circuits and one of the sets of cathode ray beam deflecting means, means for selectively varying the peak voltage of the saw-tooth output of said generator, a pair of amplifiers each operatively connected across the load resistance of one of said plate circuits such that the amplifier output voltage is a measure of the current flow in the associated plate circuit, an electronic switching means connected to said amplifiers and operative to alternately connect the amplifier outputs to other set of cathode ray beam deflecting means, linear step voltage generator means supplying a voltage to the grids of said pair of vacuum tubes, and switch means between said pair of vacuum tubes and said cathode ray tube for timing the presentation on the screen thereof.

3. A device for visually indicating for comparison the static characteristic curves of plate voltage versus current, of a pair of vacuum tubes comprising a cathode ray tube having a fluorescent viewing screen and two sets of beam deflecting means operative to deflect the beam simultaneously in planes parallel to mutually perpendicular coordinate axes respectively, a pair of plate circuits each having an identical load resistance therein each circuit being operatively associated with one of said pair of vacuum tubes, a saw-tooth voltage wave generator connected in parallel with said plate circuits and one of the sets of cathode ray beam deflecting means, means for separately varying the peak voltage of the saw-tooth output of said generator, a pair of amplifiers each operatively connected across the load resistance of one of said plate circuits such that the amplifier output voltage is a measure of the current flow in the associated plate circuit, an electronic switching means connected to said amplifiers and operative to alternately connect the amplifier outputs to the other set of cathode ray beam deflecting means, linear step voltage generator means supplying voltage to the grids of said pair of vacuum tubes, a plurality of thyratrons in said linear step voltage generator means that fire consecutively during each saw-tooth voltage from said saw-tooth voltage generator for applying a corresponding plurality of voltages in parallel to the grids of said pair of vacuum tubes.

4. The comparator defined in claim 3 wherein said saw-tooth voltage wave generator contains a frequency supplying oscillator comprising a pair of thyratrons connected in series shunted by a capacitor to ground.

5. A comparator defined in claim 4 wherein an adjustable grid bias potential is supplied to one of the pair of oscillator thyratrons.

WARREN P. MOLAND.
HOWARD H. FERRIS.

No references cited.